(12) United States Patent
Lange

(10) Patent No.: US 11,539,404 B2
(45) Date of Patent: Dec. 27, 2022

(54) ALLOCATION OF BANDWIDTH AMONG COMMUNICATION LINKS IN DISTRIBUTED ANTENNA SYSTEM

(71) Applicant: CommScope Technologies LLC, Hickory, NC (US)

(72) Inventor: Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/521,575

(22) PCT Filed: Nov. 6, 2015

(86) PCT No.: PCT/US2015/059527
§ 371 (c)(1),
(2) Date: Apr. 24, 2017

(87) PCT Pub. No.: WO2016/073885
PCT Pub. Date: May 12, 2016

(65) Prior Publication Data
US 2017/0317722 A1 Nov. 2, 2017

Related U.S. Application Data

(60) Provisional application No. 62/076,322, filed on Nov. 6, 2014.

(51) Int. Cl.
*H04B 7/02* (2018.01)
*H04B 7/022* (2017.01)
(Continued)

(52) U.S. Cl.
CPC ............ *H04B 7/022* (2013.01); *H04W 52/42* (2013.01); *H04W 72/0453* (2013.01); *H04B 7/0417* (2013.01)

(58) Field of Classification Search
CPC ..... H04B 7/022; H04B 7/0417; H04W 52/42; H04W 72/0453
(Continued)

(56) References Cited

U.S. PATENT DOCUMENTS

| 2009/0047998 A1* | 2/2009 | Alberth, Jr. | ............ H04W 52/42 455/562.1 |
| 2009/0088102 A1* | 4/2009 | Gan | ..................... H03G 3/3036 455/127.2 |

(Continued)

FOREIGN PATENT DOCUMENTS

| CN | 102422688 A | 4/2012 |
| CN | 103081372 A | 5/2013 |

(Continued)

OTHER PUBLICATIONS

European Patent Office, "Extended European Search Report from EP Application No. 15857382.4 dated Jun. 1, 2018", From Foreign Counterpart of U.S. Appl. No. 15/521,575, filed Jun. 1, 2018, pp. 1-7, Published: EP.

(Continued)

*Primary Examiner* — Kevin M Burd
(74) *Attorney, Agent, or Firm* — Fogg & Powers LLC

(57) ABSTRACT

The present disclosure describes devices, systems, and methods for allocating bandwidth among communication links in a telecommunication system. Some aspects can involve identifying multiple transmission modes used to transmit downlink signals via remote units of a telecommunications system to groups of terminal devices. Each group of terminal devices may receive downlink signals using a respective transmission mode. Respective weights can be assigned to the groups of terminal devices based on the transmission modes. The downlink signals, which are provided to each remote unit associate with each group of terminal devices, can be configured using a respective signal (Continued)

power that is associated with a respective weight for the group of terminal devices associated with the respective remote unit.

19 Claims, 6 Drawing Sheets

(51) Int. Cl.
  *H04W 52/42* (2009.01)
  *H04W 72/04* (2009.01)
  *H04B 7/0417* (2017.01)
(58) Field of Classification Search
  USPC .......................................................... 375/299
  See application file for complete search history.

(56) References Cited

U.S. PATENT DOCUMENTS

| | | | | |
|---|---|---|---|---|
| 2009/0196215 | A1* | 8/2009 | Sabat | H03G 3/3047 |
| | | | | 370/315 |
| 2010/0279729 | A1 | 11/2010 | Hui et al. | |
| 2013/0029711 | A1 | 1/2013 | Kang et al. | |
| 2013/0195467 | A1 | 8/2013 | Schmid et al. | |
| 2014/0219267 | A1 | 8/2014 | Eyuboglu et al. | |
| 2014/0269966 | A1* | 9/2014 | Faccin | H04B 7/0413 |
| | | | | 375/267 |
| 2015/0117362 | A1* | 4/2015 | Luo | H04W 72/121 |
| | | | | 370/329 |
| 2017/0280273 | A1* | 9/2017 | Xu | H04W 48/12 |

FOREIGN PATENT DOCUMENTS

| | | |
|---|---|---|
| CN | 103581913 A | 2/2014 |
| WF | 2014076004 A2 | 5/2014 |
| WO | 2014056162 A1 | 4/2014 |

OTHER PUBLICATIONS

International Search Authority, "International Search Report for PCT Application No. PCT/US2015/059527", dated Feb. 17, 2016, pp. 1-7, Published in: WO.

European Patent Office, "Communication under Rule 71(3) from EP Application No. 15857382.4 dated Sep. 11, 2019", from Foreign Counterpart to U.S. Appl. No. 15/521,575, pp. 1-37, Published: EP.

China National Intellectual Property Administration, "First Office Action from CN Application No. 201580060198.5", from Foreign Counterpart to U.S. Appl. No. 15/521,575, filed Apr. 2, 2020, pp. 1-18, Published: CN.

China National Intellectual Property Administration, "Notice to Grant from CN Application No. 201580060198.5", from Foreign Counterpart to U.S. Appl. No. 15/521,575, filed Sep. 28, 2020, pp. 1 through 5, Published: CN.

* cited by examiner

| | | dB value | Linear value | Percentage |
|---|---|---|---|---|
| 604 | Configurable maximum gain for terminal devices associated with Group y (e.g., Groups 1, 2, 3, or 4) | _10.00_ | 10.00 | |
| 606 | Configurable PDCCH gain adjustment $G_{PDCCH}$ | _3.00_ | 2.00 | |
| 608 | Gain $G_{splitter}$ applied to TM5/TM6 signals transmitted by base station as a result of splitter unit combining TM5/TM6 signals | 3.00 | 2.00 | |
| 610 | Relative attenuation of PDCCH signal at each output port of a splitter unit resulting from PDCCH gain adjustment $G_{PDCCH}$ offsetting the attenuation caused by dividing the PDCCH signal power (e.g., an attenuation of -3.00 dB) | 0 | 1.00 | |
| 612 | Configurable percentage of frequency resources X (e.g., physical resource blocks) at antenna port of the base station for downlink traffic related to Group 0 terminal devices (including reference signal traffic and RACH traffic) | | | _5%_ |
| 614 | Gain applied to downlink signals for terminal devices in Group y (e.g., Groups 1, 2, 3, or 4) | 10.00 | 10.00 | |
| 616 | Maximum percentage $P_{0,max}$ of signal power to be used by the base station for transmitting downlink signal traffic associated with Group 0 terminal devices resulting from allocation of frequency resources X | | | 50% |
| 618 | Maximum percentage of signal power to be used by base station for transmitting downlink signal traffic associated with Group y terminal devices for a time slot in which a minimum number of Group 0 terminal devices are scheduled | | | 5% |
| 620 | Maximum percentage of signal power to be used by base station for transmitting downlink signal traffic associated with Group y terminal devices for a time slot in which a maximum number of Group 0 terminal devices are scheduled (i.e., percentage of signal power used by base station transmitting downlink signal traffic associated with Group 0 terminal devices is equal to $P_{0,max}$) | | | 3% |

FIG. 6

ALLOCATION OF BANDWIDTH AMONG COMMUNICATION LINKS IN DISTRIBUTED ANTENNA SYSTEM

CROSS-REFERENCE TO RELATED APPLICATION

This application is a U.S. National Stage application of PCT Application Serial No. PCT/US2015/059527, filed Nov. 6, 2015 and titled "Allocating Bandwidth Among Communication Links in a Telecommunication System," which claims the benefit of U.S. Provisional Application Ser. No. 62/076,322, filed Nov. 6, 2014 and titled "Allocation of Bandwidth Among Communication Links in Distributed Antenna System," the contents of all of which are incorporated herein by reference.

TECHNICAL FIELD

The present disclosure relates generally to telecommunications and, more particularly (although not necessarily exclusively), to allocating bandwidth among communication links in a telecommunication system.

BACKGROUND

Examples of a telecommunication system include a distributed antenna system ("DAS"), a repeater, and a radio access network. The telecommunication system can be communicatively coupled to base stations, such as (but not limited to) an eNodeB that is compliant with a Long Term Evolution ("LTE") standard.

The telecommunication system can be used to provide wireless communication coverage in a variety of environments, particularly in large structures such as office buildings, convention halls, airports, stadiums, and the like. A DAS, for example, can include one or more head-end units (e.g., master units) that are communicatively coupled to one or more base stations. The DAS can also include multiple remote units that are communicatively coupled to a head-end unit. The remote units, each of which can include one or more transceivers and antennas, can be distributed across a coverage area. The remote units can transmit downlink signals to mobile phones or other terminal devices within coverage areas services by the remote units and receive uplink signals from the terminal devices.

SUMMARY

The present disclosure describes device, systems, and methods for allocating bandwidth among communication links in a telecommunication system.

In some aspects, a method is provided. The method can involve identifying multiple transmission modes used to transmit downlink signals via remote units of a telecommunications systems to groups of terminal devices. Each group of terminal devices may receive downlink signals using a respective transmission mode. The method can further involve assigning respective weights to the groups of terminal devices based on the transmission modes. The method can further involve configuring the downlink signals provided to each remote unit associated with each group of terminal devices. The downlink signals can be configured using a respective signal power that is associated with a respective weight for the group of terminal devices associated with the respective remote unit.

In other aspects, a telecommunication system is provided. The telecommunication system can include multiple remote units and a processing engine. The remote units can transmit downlink signals suing multiple transmission modes to terminal devices. The processing engine can identify groups of terminal devices such that each group of terminal devices receive downlink signals using a respective transmission mode. The processing engine can assign respective weights to the groups of terminal devices based on the transmission modes. The processing device can configure the downlink signals provided to each remote unit associated with each group of terminal devices. The downlink signals can be configured using a respective signals power that is associated with a respective weight for the group of terminal devices associated with the respective remote unit.

In other aspects, a telecommunication system is provided that includes multiple remote units, a head-end unit, and a splitter unit. The remote units can transmit downlink signals using a transmission mode to a terminal device. The head-end unit can be communicatively coupled to a base station. The head-end unit can be communicatively coupled of a base station. The head-end unit can receive downlink signals from the base station intended for terminal devices and distribute the downlink signals to the remote units associated with the terminal devices. The base station can include a processing device. The processing device can identify groups of terminal devices such that each group of terminal devices receives downlink signals transmitted by the base station using a respective transmission mode. The processing device can configure downlink signals transmitted by the base station to the groups of terminal devices using a signal power that is associate with a weight for the groups of terminal devices. The splitter unit may be in a signal path between the head-end unit and the remote units. The splitter unit can receive downlink signals intended for the terminal devise and transmit modified downlink signals based on the weight of the associate group of terminal devices. The splitter unit can transmit the modified downlink signals on one or more output ports that are communicatively coupled to the remote units associated with the terminal devices.

The details of one or more aspects and examples are set forth in the accompanying drawings and the description below. Other features and aspects will become apparent from the description, the drawings, and the claims.

BRIEF DESCRIPTION OF THE DRAWINGS

FIG. 6 shows a table including power budgets obtained using a scheduling algorithm according to one aspect of the present disclosure.

DETAILED DESCRIPTION

Figure 1:
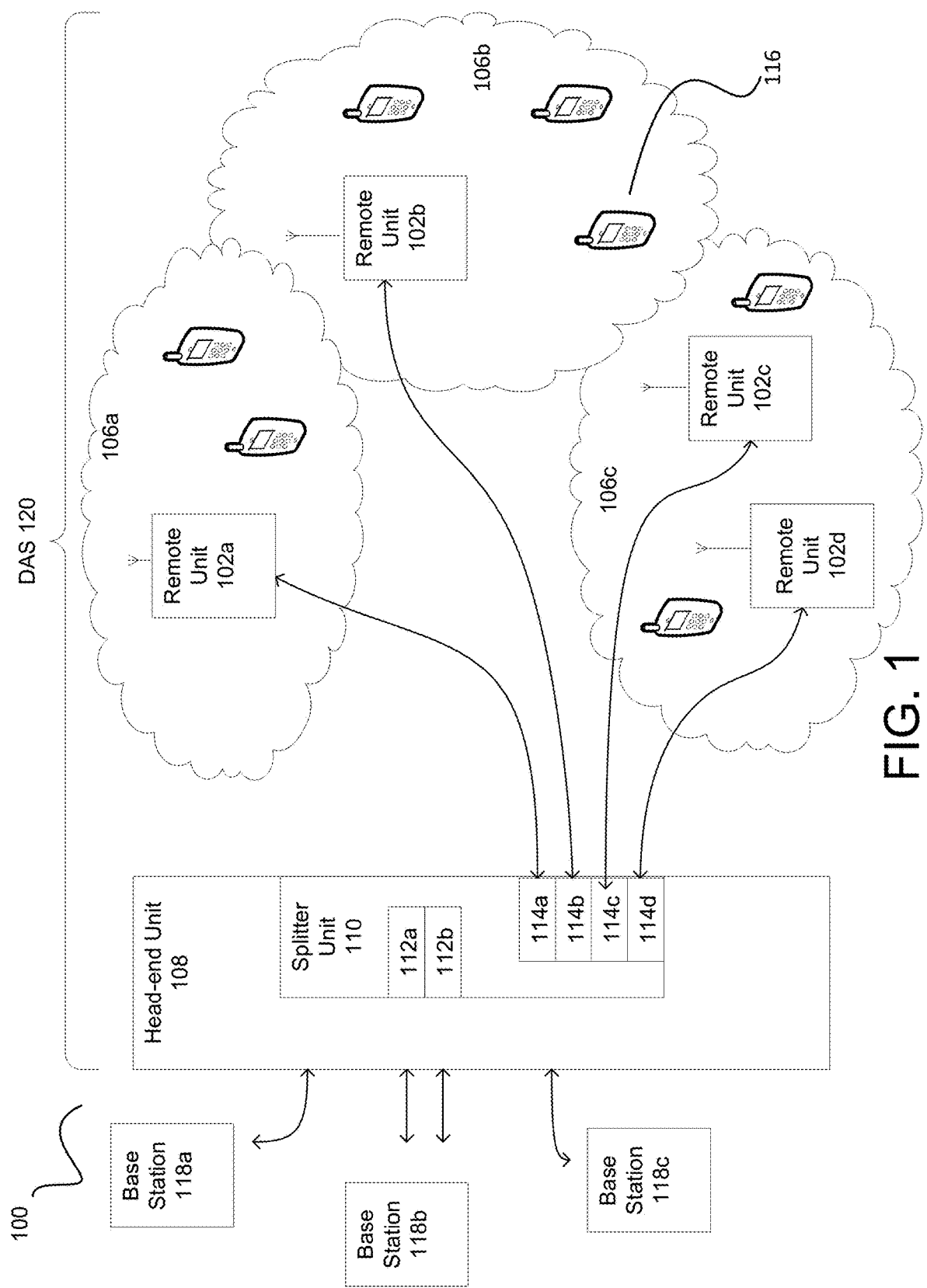
FIG. 1 shows a schematic view of an example of a telecommunication system that includes a distributed antenna system communicatively coupled to a base station according to one aspect of the present disclosure.

The present disclosure relates to allocating bandwidth among communication links in a telecommunication system based on the transmission mode used by terminal devices on each communication link. For example, a processing engine executed by a unit in the telecommunication system may identify the transmission mode of a particular terminal device. The processing engine can be used to configure downlink signals transmitted to the particular device based on the identified transmission mode.

Transmission modes may be classified based on any number of characteristics of the method or hardware used for transmitting signals. Some transmission modes are determined based on the number of antennas at the transmitter and receiver. For instance, signals that are transmitted using a multiple-input/multiple-output ("MIMO") system may have a different transmission mode from signals sent using a multiple-input/single-output ("MISO") system. In some examples, a transmission mode may be based on the medium used to transmit the signal such as optical, twisted cooper, and wireless communication paths. In some examples, a transmission mode can be based on the number of paths between devices. For example, a signal in a full duplex communication system may have a different transmission mode than a signal being transmit over a half-duplex system.

In some aspects, a telecommunication system can use one or more transmissions modes defined in the Long Term Evolutions ("LTE") standard. In other aspects, a telecommunication system can use one or more transmission modes defined by the Code Division Multiple Access ("CDMA") standard, Global System for Mobile Communications ("GSM") standard, or $3^{rd}$ Generation Partnership Project ("3GPP"). In other aspects, a telecommunication system can use one or more transmission modes defined by a combination of standards.

Remote units in a telecommunication system can be set up to operate in a certain manner when transmitting signals to terminal devices. For example, remote units can amplify signals by a certain amount. But some signals from a base station may already be amplified or attenuated at a certain level such that the gain applied by remote units may result in overdriving remote units or a signal without sufficient amplification. For example, some telecommunication systems include a splitter unit that modifies downlink signals based on their transmission mode. The splitter unit can be positioned in a signal path between a base station and a remote unit such that downlink signals transmitted by the base station towards a terminal device are received by the splitter unit.

The splitter unit may combine or divide the downlink signals based on the transmission mode of the terminal device to form modified downlink signals. The splitter unit may provide these modified downlink signals to the remote units associated with the terminal device. The modified downlink signal received by the remote unit may have a different signal power as compared to the corresponding downlink signal received from a base station. In this case, the remote unit cannot apply the same gain that it would have applied had the splitter not been present without overdriving a power amplifier of the remote unit or operating with a reduced coverage area.

For example, a splitter unit may receive two downlink signals intended for a terminal device operating in LTE transmission mode 6. The splitter may be programmed to combine downlink signals associated with LTE transmission mode 6. The splitter may also be programmed to provide modified downlink signals with a combined signal power to the remote units. The remote units that receive the modified downlink signals may apply an additional gain to the downlink signals. If the splitter operations have already amplified the downlink signals, the additional gain applied to the downlink signals may overdrive a power amplifier of the remote unit.

The present disclosure includes some examples of a telecommunication system that can modify downlink signals prior to providing the signals to remote units. The modification of the downlink signal can avoid overdriving remote units. The modification of the downlink signal can also avoid outputting downlink signals remote the remote units that have insufficient signal power to be received by terminal devices. In some examples, the output power of remote units can be stabilized by identifying the transmission mode of a terminal device receiving downlink signals and configuring the downlink signals to compensate for the effects of a splitter unit in a signal path to the remote units. For example, downlink signals that will be combined by the splitter because of their associated transmission mode may be transmitted at a lower signal power such that the signal power of the modified downlink signals received by the remote device are below a threshold signal power.

Telecommunication systems can be any type of system for extending wireless coverage. Examples of telecommunication systems include a digital antenna system ("DAS"), a repeater, or a radio access network. In some aspects, a base station that is included in or communicatively coupled to a telecommunication system can configure downlink signals in the manner described herein. In additional or alternative aspects, a head-end unit that is included in or communicatively coupled to a telecommunication system can configure downlink signals in the manner described herein. A head-end unit can be communicatively coupled to a base station from which the downlink signals are received.

FIG. 1 depicts an example of a telecommunication system 100. The telecommunication system 100 depicted in FIG. 1 includes a DAS 120 coupled to base stations 118a-c according to some aspects. The DAS 120, which can span a building or other structure, can include multiple remote units 102a-d or other radiating units that transmit the downlink signals in different coverage areas 106a-c.

The DAS 120 may include a head-end unit 108 communicatively coupled to the remote units 102a-d. Although FIG. 1 depicts one head-end unit 108, any number of head-end units can be included. The head-end unit 108 may be communicatively coupled to base stations 118a-c via wired or wireless connections. The head-end unit 108 can receive downlink signals from base stations 118a-c and distribute downlink signals in analog or digital format to the remote units 102a-d.

The remote units 102a-d can transmit the downlink signals to terminal devices 116 within coverage areas 106a-c serviced by the remote units 102a-d. A non-limiting example of a remote unit is a universal access point ("UAP"). Different sets of remote units 102a-d can service different portions of a coverage area 106a-c in the DAS 120.

For example, remote unit 102a may service a first floor, remote unit 102b may service a second floor, and remote units 102d and 102c may service a third floor of a building in which the DAS 120 is installed. The remote units 102a-d can use an air interface that supports multiple frequency bands for transmitting and receiving signals. Each of the remote units 102a-d can transmit and receive multiple RF signals.

In the uplink direction, signals from terminal devices 116 may be received by the remote units 102a-d. The remote units 102a-d may combine uplink signals and transmit the combined uplink signals to the head-end unit 108. The head-end unit 108 may transmit uplink signals to the serving base stations 118a-c.

The DAS 120 can be configured for multiple-input/multiple-output ("MIMO") operation using the remote units 102a-d. For example, the base stations 118a-c can provide service for two groups of remote units 102a-d configured for single user MIMO ("SU-MIMO") operation, three groups of remote units 102a-d (one configured for SU-MIMO operation and two configured for multiple-user MIMO ("MU-MIMO") operation), or four groups of remote units 102a-d configured for MU-MIMO operation.

The base stations 118a-c can use the DAS 120 to communicate with terminal devices 116. An example of a base station is an eNodeB of an LTE telecommunication system.

The DAS 120 may include a splitter unit 110 in a signal path between base stations 118a-c and the remote units 102a-d. The splitter unit 110 can be used to split downlink signals received from the base stations 118a-c for transmission to different sets of remote units 102a-d. In some aspects, the splitter unit 110 can be included in a head-end unit 108. In additional or alternative aspects, the splitter unit 110 can be positioned in components other than the head-end unit 108.

The base stations 118a-c can transmit multiple downlink signals to the splitter unit 110 via multiple antenna ports. The splitter unit 110 can receive the multiple downlink signals from the base stations 118a-c via input ports 112a, 112b of the splitter unit 110. The splitter unit 110 may be configured to combine the signal power from multiple downlink signals and provide the combined signal power to one of the output ports 114a-d of the splitter unit 110.

For example, if a base station 118b is configured for operation in a MU-MIMO mode (e.g., LTE transmission mode 5) or in a mode using a closed-loop spatial multiplexing with a single transmission layer (e.g., LTE transmission mode 6), the base station 118b may transmit two downlink signals during a time slot. The splitter unit 110 may combine the signal powers from the two downlink signals and output a combined signal at an output port 114b of the splitter unit 110. A remote unit 102b that is communicatively coupled to the output port 114b of the splitter unit 110 can receive, from the output port 114b of the splitter unit 110, a downlink signal having the combined signal power. The output power used by the remote unit 102b as a result of receiving the combined signal power from the splitter unit 110 can be an absolute power.

In this example, the base station 118b can be configured to transmit downlink signals in such a manner that the absolute power associated with a combined signal power at the output port 114b of the splitter unit 110 does not exceed the capabilities of the remote unit 102b. For example, the base station 118b can avoid overdriving the remote unit 102b by decreasing the signal power at which the base station 118b transmits downlink signals for certain transmission modes. These transmission mods can include, for example, LTE transmission modes 5 and 6 or other transmission modes that cause the splitter unit 110 to combine signal power from multiple downlink signals received in a time slot.

The splitter unit 110 may also be configured to divide the signal power from multiple downlink signals and provide the divided signal power to multiple output ports 114a-d of the splitter unit 110. The base stations 118a-c can be configured to transmit downlink signals in such a manner that a signal power associated with a combined signal power at one or more of the output ports 114a-d of the splitter unit 110 is sufficient. For example, the base stations 118a-c may increase the signal power at which the base stations 118a-c transmit downlink signals for certain transmission modes.

The base stations 118a-c can also adjust the signal power used to transmit control information with downlink signals over one or more control channels. For example, the base stations 118a-c may transmit downlink signals on a Physical Downlink Control Channel ("PDCCH"). The signal power for a PDCCH signal can be divided among the output ports 114a-d of the splitter unit 110. Dividing the PDCCH signal power can cause a remote unit 102a communicatively coupled to a given output port 114a of the splitter unit 110 to receive a PDCCH signal at a lower signal power as compared to the signal power of the PDCCH signal when transmitted via an antenna port of the base stations 118a-c. Receiving a PDCCH signal having a lower signal power can cause the remote unit 102a to service a geographically smaller coverage area.

In some aspects, the base stations 118a-c can compensate for the effect of the splitter unit 110 on PDCCH signals by adjusting the gain of the PDCCH signal and thereby boosting the PDCCH signal power. For example, one or more of the base stations 118a-c can adjust the signal power used to transmit control information with downlink signals over one or more control channels. In additional or alternative aspects, the head-end unit 108 can compensate for the effect of the splitter unit 110 on PDCCH signals. For example, a head-end unit 108 can adjust the signal power used to transmit control information with downlink signals prior to providing the downlink signals to the splitter unit 110.

The DAS 120 can be configured to efficiently utilize the available bandwidth of communication links between the head-end unit 108 and the remote units 102a-d. The available bandwidth of communication links can be efficiently utilized by reducing the amount of data transmitted between the base stations 118a-c and the remote units 102a-d via the DAS 120. For example, the amount of data can be reduced by limiting a number of physical resource blocks ("PRBs") used by a group of remote units 102a-d during a time slot in which the base station 118a-c transmits downlink signals. Limiting the number of PRBs used by a group of remote units 102a-d can allow for increasing gain provided by the power amplifiers of the base stations 118a-c without exceeding the power envelope for the power amplifier.

Base stations 118a-c or other suitable devices can adjust the signal power of downlink signals transmitted such that downlink signal power is outputted efficiently by the splitter unit 110. For example, base stations 118a-c can select signal powers used to transmit different downlink signals such that a low-loaded radio node transmits downlink signals using an output power that is below a threshold power. A radio node can include a remote unit 102a-d or a group of remote units 102a-d communicatively coupled to one or more output ports 114a-d of the splitter unit 110. The threshold power can be a percentage of the nominal output power of a radio node (e.g., 10% of the nominal output power). One or more of the base stations 118a-c can increase the signal power targeted to a low-loaded radio node based on determining that the low-loaded radio node is transmitting downlink signals using an output power at or below the threshold power.

Figure 2:
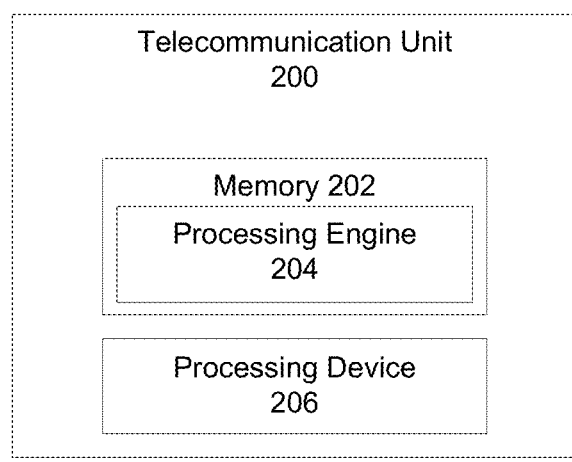
FIG. 2 shows a block diagram of an example of a telecommunication unit with a processing device that executes a media access control ("MAC") processing engine for improving power efficiency and bandwidth allocation in the telecommunication system of FIG. 1 according to one aspect of the present disclosure.

FIG. 2 depicts an example of a processing engine 204 used to improve bandwidth capacity executed by a processing device 206 (or group of processing devices 206) in a telecommunication unit 200. Examples of the telecommunication unit 200 include a base station 118 depicted in FIG. 1, a head-end unit 108 depicted in FIG. 1, or other telecommunication device. The processing device 206 can include or be communicatively coupled with a memory device 202. The memory device 202 can be a non-transitory computer-readable medium for storing program instructions that are executable by the processing device 206. Non-limiting examples of the processing device 206 include a microprocessor, an application-specific integrated circuit ("ASIC"), a field-programmable gate array ("FPGA"), or other suitable processor. The executable program instructions can include a media access control ("MAC") processing engine or other suitable processing engine 204. The processing engine 204 can be executed by the processing device 206 to perform one or more operations for improving bandwidth allocation among communication links in a DAS 120.

Figure 3:
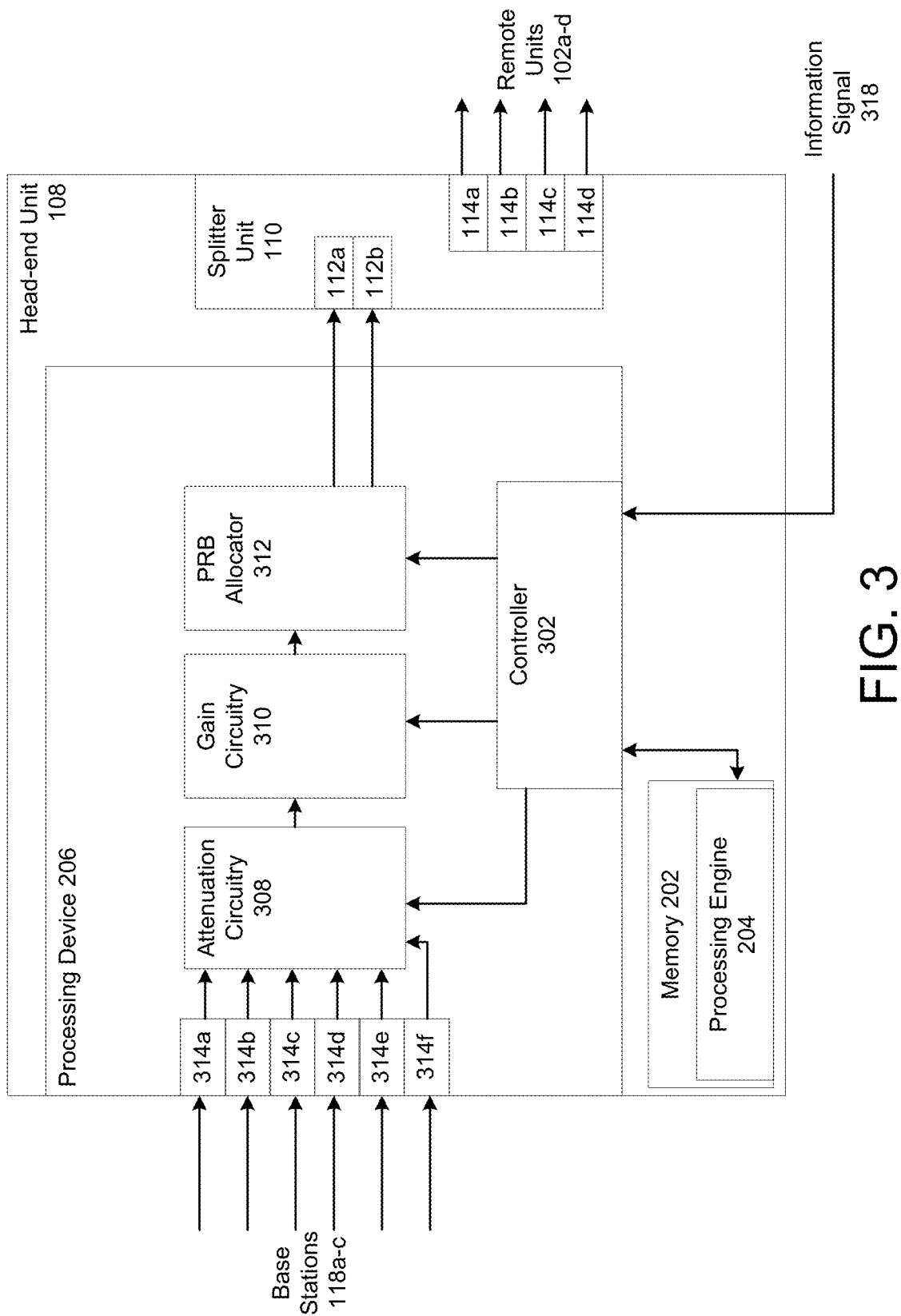
FIG. 3 shows a block diagram of an example of a head-end unit as the telecommunication unit from FIG. 2 according to one aspect of the present disclosure.

FIG. 3, described in reference to FIG. 1 and FIG. 2, depicts an example in which a processing device 206 in a head-end unit 108 executes the processing engine 204 for performing MAC layer processing. The processing device 206 may receive downlink signals from base stations 118a-c via one or more of input ports 314a-f. A controller 302 can pass the downlink signals through one or more circuits to configure the downlink signal based on the transmission mode of an associated terminal device. The controller 302 can communicate data with the processing engine 204.

The controller 302 may receive an information signal 318 at an input port 306. The information signal 318 can be used to determine the transmission mode of one or more terminal devices. Although FIG. 3 shows the controller 302 receiving information signal 318, the controller 302 may determine the transmission mode of terminal devices without information signal 318.

The controller 302 can pass the downlink signals through attenuation circuitry 308, gain circuitry 310, PRB allocator 312, or any other circuitry to configure the downlink signals. In some examples, the processing engine 204 can control gain assignments and schedules on a slot by slot basis for a similar or different set of terminal devices 116. The processing engine 204 can ensure that the gain circuitry 310 of the head-end unit 108 and the remote units 102a-d are operating in a linear region without overdriving their power amplifiers. In some aspects, the gain of the control channel may not be changed.

Although FIG. 3 depicts the processing device 206 in a head-end unit 108, other implementations are possible. For example, the processing device 206 can be included in one or more of the base stations 118a-c.

The processing engine 204 can execute one or more scheduling algorithms to assign the terminal devices 116 into groups. For example, the processing engine 204 may generate five groups for managing the terminal devices 116 serviced by the DAS 120.

A first group (e.g., "Group 0") can include terminal devices 116 that receive downlink signals that are transmitted by the base stations 118a-c using transmission modes 1, 2, or 3 of the LTE standard. The Group 0 terminal devices 116 can be terminal devices 116 located in areas of low signal coverage. A splitter unit 110 can divide the signal power for Group 0 downlink signals and provide the divided signal power to each of the output ports 114a-d. Other groups (e.g., Groups 1-4) can include terminal devices 116 that receive downlink signals that are transmitted by the base stations 118a-c using transmission modes 4, 5, or 6 of the LTE standard.

Different terminal devices 116 in Groups 1-4 can be grouped based on a pre-coding matrix indicator ("PMI") used to transmit downlink signals to the terminal devices 116. Terminal devices 116 that receive downlink signals transmitted using transmission mode 4 can be assigned two groups associated with different PMIs. Encoding sets of downlink signals using a given PMI can cause the signal power for the downlink signal to be routed to a given one of the output ports 114a-d.

For example, multiple downlink signals transmitted by one or more of the base stations 118a-c and encoded with a first PMI (e.g., a PMI associated with Group 1) can have a first phase difference corresponding to the first PMI. The first phase difference can cause circuitry of the splitter unit 110 to combine the signal power of the downlink signals and provide the combined signal power to one of the output ports 114a-d of the splitter unit 110 (e.g., an output port 114c communicatively coupled to a remote unit 102c servicing terminal devices 116 in Group 1). Another set of downlink signals transmitted by one or more of the base stations 118a-c and encoded with a second PMI (e.g., a PMI associated with Group 4) can have a second phase difference corresponding to the second PMI. The second phase difference can cause circuitry of the splitter unit 110 to combine the signal power of the downlink signals and provide the combined signal power to another one of the output ports 114a-d of the splitter unit 110 (e.g., an output port 114d communicatively coupled to a remote unit 102d servicing terminal devices 116 in Group 4).

In some examples, the number of groups used by the base stations 118a-c can be determined based on the number of output ports 114a-d in the splitter unit 110. A maximum number of groups can be equal to the number of splitter unit 110 output ports 114a-d (e.g., each group receiving downlink signals via a respective one of the splitter unit 110 output ports 114a-d) plus one (e.g., a group using transmission modes 1-3 receiving downlink signals via all of the splitter unit 110 output ports 114a-d). In some aspects, fewer groups can be used if one or more of the output ports 114a-d are not active.

For example, the splitter unit 110 has four output ports. Group 1 (e.g., terminal devices 116 receiving downlink signals using transmission mode 4 with a first PMI) can receive downlink signals via remote units 102a-d communicatively coupled to a first output port 114a. Group 2 (e.g., terminal devices 116 receiving downlink signals using transmission mode 4 with a second PMI) can receive downlink signals via remote units 102a-d communicatively coupled to a second output port 114b. Group 3 (e.g., terminal devices 116 receiving downlink signals using transmission mode 5) can receive downlink signals via remote units 102a-d communicatively coupled to a third output port 114c. Group 4 (e.g., terminal devices 116 receiving downlink signals using transmission mode 4) can receive downlink signals via remote units 102a-d communicatively coupled to a fourth output port 114d. Group 0 (e.g., terminal devices 116 receiving downlink signals using transmission modes 1, 2, or 3) can receive downlink signals via remote units 102a-d communicatively coupled to any of the output ports 114a-d.

In some examples, one or more of the base stations 118a-c can modify the amount of power or frequency resources used to transmit downlink signals to different groups of terminal devices 116 serviced by different remote units 102a-d. The maximum gain used in Groups 1 to 4 can limit the maximum percentage of the Group 0 terminal devices 116 being assigned for an individual slot. For example, a 10 dB gain for Group 1 terminal devices 116 may limit the maximum percentage of Group 0 terminal devices 116 for a slot to 20%. By contrast, having 20% of Group 0 terminal devices 116 for a slot may prevent scheduling of Group 1 terminal devices 116 for this slot. For a case in which 20% or fewer of the terminal devices 116 for a slot are Group 0 terminal devices 116, resources may be assigned to Group 1 terminal devices 116 for this slot. For terminal devices 116 in Groups 2-4, independent rules may be applied for gain assignments.

In some examples, a gain G assigned for a remote unit 102a-d can be determined from the formula $G = G_{PDCCH}/(N_0 + G_0 \times N_x)$. The variable $N_0$ is the percentage of frequency resources allocated to terminal devices 116 in Group 0. The variable $N_x$ is percentage of frequency resources allocated to terminal devices 116 in Group x. The variable $G_0$ is the gain for terminal devices 116 in Group 0. The variable gain $G_{PDCCH}$ is the gain used for boosting of the control channels.

A scheduling algorithm can be used to optimize a DAS 120. In some aspects, the scheduling algorithm can be performed for each time slot in which the base stations 118a-c transmit downlink signals via the DAS 120. Optimizing the DAS can include limiting assignment of frequency resources for transmitting downlink signals to different groups of terminal devices 116 in a given time slot. Optimizing the DAS can include balancing the signal power allocated for downlink traffic targeted to Group 0 terminal devices 116 and the signal power allocated for downlink traffic targeted to terminal devices 116 in Groups 1-4.

The processing engine 204 can adjust a signal power of downlink signals such that the signal power is outputted efficiently by the splitter unit 110. For example, the processing engine 204 can select signal powers used to transmit different downlink signals such that a low-loaded radio node transmits downlink signals using an output power that is below a threshold power. A radio node can include a single remote unit 102a or a group of remote units 102a-d communicatively coupled to an output port 114a of the splitter unit 110. The threshold power can be a percentage of the nominal output power of a radio node (e.g., 10% of the nominal output power). The processing engine 204 can cause an increase in the signal power of signals targeted to a low-loaded radio node based on determining that the low-loaded radio node is transmitting downlink signals using an output power at or below the threshold power.

In some aspects, the processing engine 204 can execute a scheduling algorithm that determines whether a user allocation in a current slot will exceed an allocated power budget.

Figure 4:
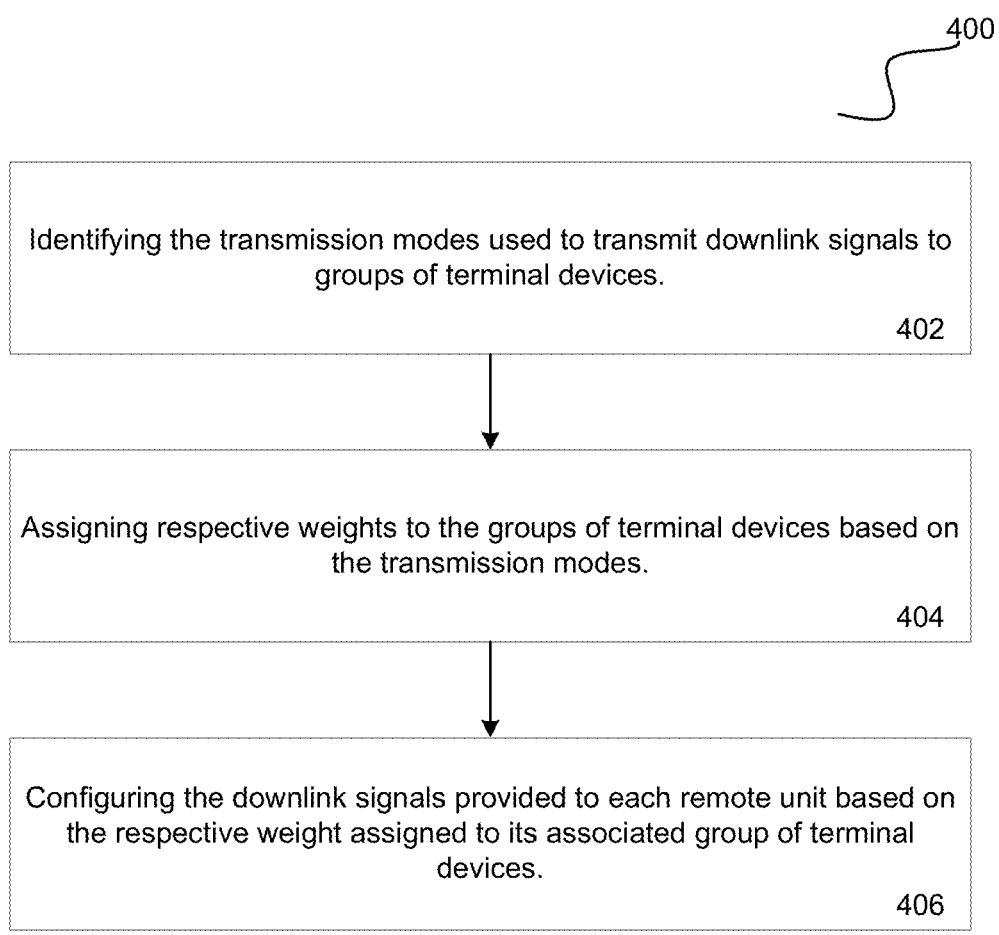
FIG. 4 shows a flow chart of a process for improving power efficiency in the telecommunication system of FIG. 1 according to one aspect of the present disclosure.

FIG. 4 depicts a process 400 for improving bandwidth allocation among communication links in a telecommunication system 100. The process 400 can be performed by the telecommunication unit 200, such as one of the base stations 118a-c, a head-end unit 108, or a combination of suitable devices in a telecommunication system. Other implementations, however, are possible.

In block 402, the telecommunication unit 200 identifies the transmission modes used to transmit downlink signals to groups of terminal devices 116. In block 404, the telecommunication unit 200 assigns respective weights to the groups of terminal devices 116 based on the transmission modes. In block 406, the telecommunication unit 200 configures the downlink signals provided to each remote unit 102a-d based on the respective weight assigned to its associated group of terminal devices 116.

Figure 5:
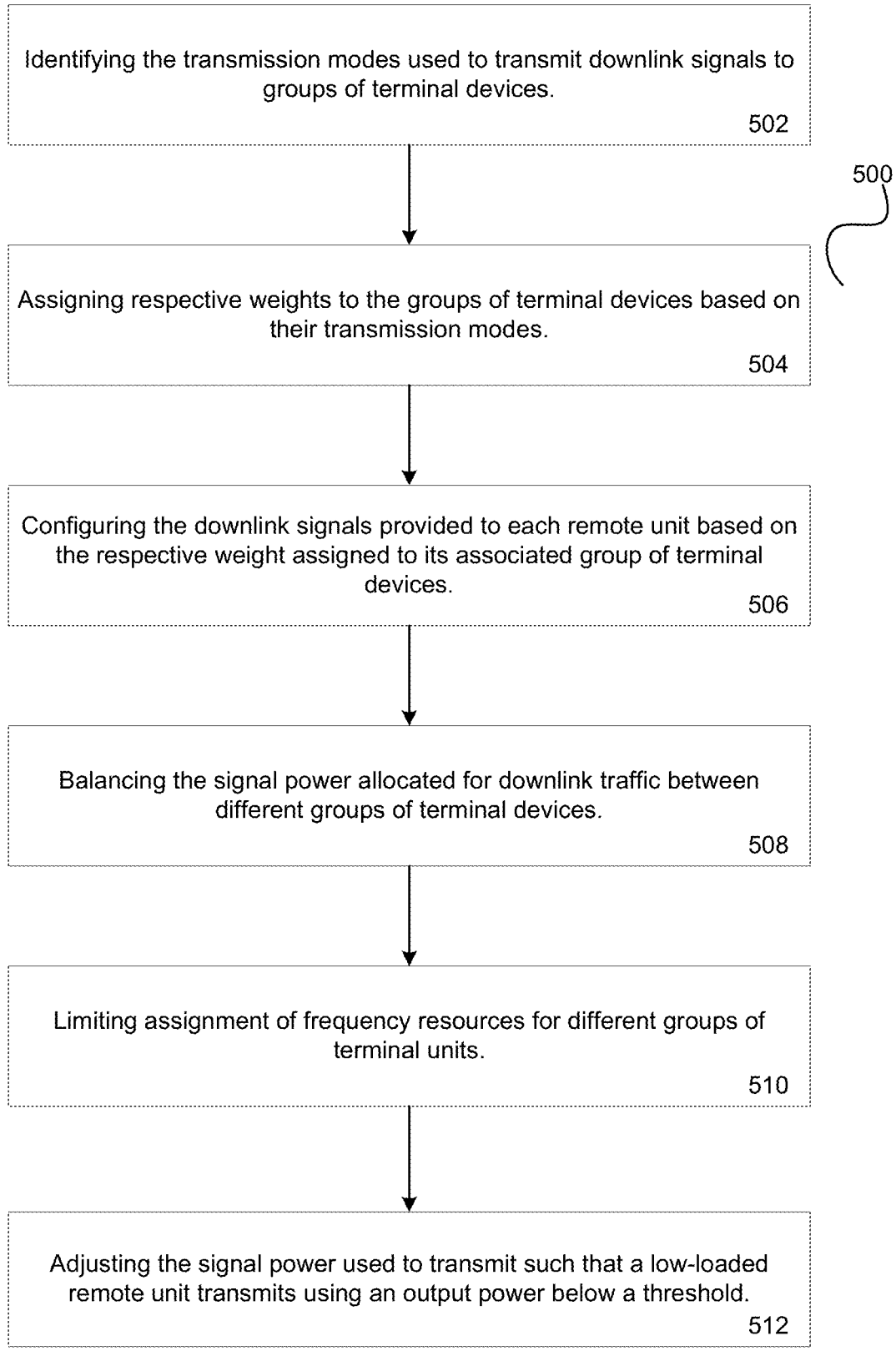
FIG. 5 shows a flow chart of a process for improving bandwidth allocation in the telecommunication system of FIG. 1 according to one aspect of the present disclosure.

FIG. 5 depicts a process 500 by which a telecommunication unit 200 can configure the downlink signals provided to one or more of the remote units 102a-d. The process 500 can be performed by any suitable telecommunication unit 200, such as one of the base stations 118a-c, a head-end unit 108, or a combination of suitable devices in a telecommunication system. Other implementations, however, are possible.

In block 508, the telecommunication unit 200 balances the signal power allocated for downlink traffic between different groups of terminal devices 116. In block 510, the telecommunication unit 200 limits assignment of frequency resources for different groups of terminal devices 116. In block 512, the telecommunication unit 200 adjusts the signal power used to transmit, such that a low-loaded remote unit transmits downlink signals using an output power below a threshold.

FIG. 6, described in reference to FIGS. 1 and 3, shows a table that includes examples of power budgets obtained using a scheduling algorithm. The bold, italicized values 602 indicate variable values that can be inputted into or otherwise obtained by the processing engine 204.

In the example depicted by FIG. 6, a gain $G_0$ 614 can be applied by the splitter unit 110 to downlink signals that are transmitted by the base stations 118a-c to terminal devices 116 associated with one of the Groups 1-4. Examples of these terminal devices include terminal devices 116 configured for operating in transmission modes 5 or 6 and serviced by a remote unit 102a-d communicatively coupled to one of the output ports 114a-d of the splitter unit 110. For example, the base stations 118a-c transmit downlink signals targeted to a terminal device 116 in Group 1 using transmission modes 5 or 6. The splitter unit 110 can provide the combined signal power of the downlink signals at one of the output ports 114a-d that is communicatively coupled to one or more of the remote unit 102a-d in communication with terminal devices 116 in Group 1. The combined signal power has a gain $G_0$ 614 as compared to the signal power of the downlink signals if the splitter unit 110 were absent.

The processing engine 204 can be configured with a PDCCH gain adjustment 606. The PDCCH gain adjustment 606 can prevent or otherwise reduce negative impact on the remote units 102a-d that may result from decreasing the signal power at which the base station 118a-c transmits downlink signals for certain transmission modes of operation (e.g., decreased coverage for one or more of the remote units 102a-d).

For example, a base station 118 may be configured with a PDCCH gain adjustment 606 in the range of −6 dB to +4 dB. In FIG. 6, the processing engine 204 is configured to use a PDCCH gain adjustment 606 of 3 dB. The PDCCH gain adjustment 606 of 3 dB can reduce the relative attenuation of the PDCCH signals received by the remote units 102a-d via the splitter unit 110. This relative attenuation 610 is the difference between the desired PDCCH signal power if a remote unit 102a-d were directly connected to the base stations 118a-c (e.g., without division of the PDCCH signal power among the output ports 114a-d) and the PDCCH signal power for the remote unit 102a-d receiving the PDCCH signal via the splitter unit 110. The amount of relative attenuation 610 is the difference between the PDCCH gain adjustment 606 and the amount by which the base station 118a-c reduces the signal power of downlink signals to compensate for the gain $G_{splitter}$ 608. For the example values depicted in FIG. 6, the relative attenuation 610 is nearly zero.

The processing engine 204 can also be configured with a maximum gain for terminal devices 116 associated with the Groups 1-4 604 and a percentage of frequency resources 612 (e.g., PRBs) allocated by the base stations 118a-c to downlink traffic associated with terminal devices 116 in Group 0 and transmitted by the base station 118. The maximum gain 604 is 10 dB and the percentage of frequency resources allocated to Group 0 traffic is 5% 612. These configurable values can be used by the processing engine 204 to determine the maximum percentage $P_{0,max}$ 616 of signal power to be used by the base stations 118a-c for transmitting downlink signal traffic associated with Group 0 terminal devices 116 in accordance with the specified allocation of Group 0 frequency resources. These configurable values 602 can also be used by the processing engine 204 to determine the maximum percentage of signal power to be used by base stations 118a-c for transmitting downlink signal traffic associated with Group y terminal devices 116 for a time slot in which a minimum number of Group 0 terminal devices 116 are scheduled 618. These configurable values can also be used by the processing engine 204 to determine the maximum percentage of signal power to be used by base stations 118a-c for transmitting downlink signal traffic associated with Group y terminal devices 116 for a time slot in which a maximum number of Group 0 terminal devices 116 are scheduled 620.

The scheduler applies a gain of 10 dB (e.g., the maximum gain 614) for Group y (e.g., Groups 1-4) terminal devices 116 and allocates 5% of frequency resources to Group 0 traffic 602 can limit the portion of downlink signal power associated with Group 0 terminal devices 116 to 50% of the downlink signal power 616.

In one example, the maximum downlink signal power for Group 0 traffic may be used by base stations 118a-c (e.g., 5% of the frequency resources 612 and 50% of the downlink power 616). In this example, 3% of the downlink signal power can be used for transmitting Group y traffic 620 having a gain of 10 dB 620. In another example, the downlink signal power for Group 0 traffic used by base stations 118a-c may be minimized. In this example, 5% of the downlink signal power can be used for transmitting Group y traffic having a gain of 10 dB 618.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A method comprising:
   identifying a first transmission mode used to transmit first downlink signals via one or more remote units of a telecommunications system to a first group of terminal devices;
   identifying a second transmission mode used to transmit second downlink signals via the one or more remote units of the telecommunications system to a second group of terminal devices;
   assigning a first percentage of frequency resources to the first group of terminal devices based on the first transmission mode;
   assigning a second percentage of frequency resources to the second group of terminal devices based on the second transmission mode;
   configuring the first downlink signals provided to each remote unit associated with the first group of terminal devices using a first signal power that is associated with the first percentage of frequency resources for the first group of terminal devices associated with the respective remote unit, wherein the first signal power corresponds to a level that compensates for a power level of the first downlink signals being divided by a splitter prior to providing the first downlink signals to the one or more remote units; and
   configuring the second downlink signals provided to each remote unit associated with the second group of terminal devices using a second signal power that is associated with the second percentage of frequency resources for the second group of terminal devices associated with the respective remote unit, wherein the second signal power corresponds to a level that compensates for a power level of the second downlink signals being combined by a splitter prior to providing the second downlink signals to the one or more remote units.

2. The method of claim 1, wherein configuring the first downlink signals and configuring the second downlink signals includes configuring the first downlink signals and configuring the second downlink signals by at least one processor in a head-end unit in a distributed antenna system.

3. The method of claim 1, wherein configuring the first downlink signals and configuring the second downlink signals includes configuring the first downlink signals and configuring the second downlink signals by at least one processor in a base station communicatively coupled to a distributed antenna system.

4. The method of claim 1, wherein configuring the first downlink signals and configuring the second downlink signals comprises balancing a signal power allocated for downlink traffic targeted to terminal devices in the first group and a signal power allocated for downlink traffic targeted to terminal devices in one or more other groups including the second group.

5. The method of claim 1, further comprising limiting assignment of frequency resources for transmitting the first downlink signals to the first group of terminal devices and for transmitting the second downlink signals to the second group of terminal devices in a given time slot.

6. The method of claim 1, wherein the first downlink signals comprise control information transmitted over one or more control channels.

7. The method of claim 1, wherein the first transmission mode includes single antenna transmission (transmission mode 1 of the LTE standard), transmit diversity (transmission mode 2 of the LTE standard), or open loop codebook based pre-coding (transmission mode 3 of the LTE standard),
   wherein the second transmission mode includes closed-loop spatial multiplexing (transmission mode 4 of the LTE standard), multi-user MIMO (transmission mode 5 of the LTE standard), or closed-loop spatial multiplexing with a single transmission layer (transmission mode 6 of the LTE standard).

8. The method of claim 1, further comprising increasing the first power level based on a determination that a low-loaded remote unit is transmitting the first downlink signals using an output power below a threshold power level.

9. A telecommunications system comprising:
  a plurality of remote units configured to transmit downlink signals using multiple transmission modes to terminal devices; and
  at least one processor configured to:
    identify a first group of terminal devices, wherein the first group of terminal devices receives first downlink signals using a first transmission mode;
    identify a second group of terminal devices, wherein the second group of terminal devices receives second downlink signals using a second transmission mode;
    assign a first percentage of frequency resources to the first group of terminal devices based on the first transmission mode;
    assign a second percentage of frequency resources to the second group of terminal devices based on the second transmission mode;
    configure the first downlink signals provided to each remote unit associated with the first group of terminal devices using a first signal power that is associated with the first percentage of frequency resources for the first group of terminal devices associated with the respective remote unit, wherein the first signal power corresponds to a level that compensates for a power level of the first downlink signals being divided by a splitter prior to providing the first downlink signals to the remote units; and
    configure the second downlink signals provided to each remote unit associated with the second group of terminal devices using a second signal power that is associated with the second percentage of frequency resources for the second group of terminal devices associated with the respective remote unit, wherein the second signal power corresponds to a level that compensates for a power level of the second downlink signals being combined by a splitter prior to providing the second downlink signals to the remote units.

10. The system of claim 9, wherein the at least one processor is further configured to:
  balance the signal power allocated for downlink traffic targeted to terminal devices in the first group; and
  balance the signal power allocated for downlink traffic targeted to terminal devices in one or more other groups including the second group.

11. The system of claim 9, wherein the at least one processor is further configured to limit assignment of frequency resources for transmitting the first downlink signals to the first group of terminal devices and for transmitting the second downlink signals to the second group of terminal devices in a given time slot.

12. The system of claim 9, wherein the telecommunications system comprises a base station or head-end unit configured to transmit the first downlink signals comprising control information over one or more control channels.

13. The system of claim 9, wherein the at least one processor is further configured to:
  identify sets of terminal devices within groups of terminal devices wherein each set of terminal devices receives downlink signals based on a respective pre-coding matrix indicator;
  assign respective weights to the sets of terminal devices based on the pre-coding matrix indicator; and
  configure the downlink signals provided to each remote unit associated with each set of terminal devices using a respective signal power that is associated with a respective weight for the set of terminal devices associated with the respective remote unit.

14. The telecommunications system of claim 9, wherein the at least one processor is configured to increase the first power level based on a determination that a low-loaded remote unit is transmitting the first downlink signals using an output power below a threshold power level.

15. A telecommunications system comprising:
  a plurality of remote units for transmitting downlink signals using a transmission mode to terminal devices; and
  a head-end unit configured to be communicatively coupled to a base station, receive downlink signals from the base station intended for terminal devices, and distribute the downlink signals to the remote units associated with the terminal devices,
  wherein the base station comprises at least one processor configured to:
    identify a first group of terminal devices, wherein the first group of terminal devices receives first downlink signals transmitted by the base station using a first transmission mode,
    identify a second group of terminal devices, wherein the second group of terminal devices receives second downlink signals transmitted by the base station using a second transmission mode;
    assign a first percentage of frequency resources to the first group of terminal devices based on the first transmission mode,
    assign a second percentage of frequency resources to the second group of terminal devices based on the second transmission mode,
    configure the first downlink signals transmitted by the base station to the first group of terminal devices using a first signal power that is associated with the first percentage of frequency resources for the first group of terminal devices, and
    configure the second downlink signals transmitted by the base station to the second group of terminal devices using a second signal power that is associated with the second percentage of frequency resources for the second group of terminal devices; and
  a splitter in a signal path between the head-end unit and the remote units, the splitter configured to:
    receive the first downlink signals intended for the first terminal devices and the second downlink signals intended for the second terminal devices,
    divide a power level of the first downlink signals to generate modified first downlink signals,
    combine a power level of the second downlink signals to generate modified second downlink signals,
    transmit the modified first downlink signals via output ports communicatively coupled to the remote units associated with the first group of terminal devices, wherein the first signal power corresponds to a level that compensates for the power level of the first downlink signals being divided by the splitter, and
    transmit the modified second downlink signals via an output port communicatively coupled to the remote units associated with the second group of terminal devices, wherein the second signal power corresponds to a level that compensates for the power level of the second downlink signals being combined by the splitter.

16. The system of claim 15, wherein the first downlink signals are transmitted over a control channel and the splitter is configured to divide the signal power for a control signal over the control channel across multiple outputs of the splitter.

17. The system of claim 16, wherein the at least one processor is further configured to compensate for the effect of the splitter on signals transmitted over the control channel by increasing a gain of the control channel.

18. The system of claim 15, wherein the at least one processor is further configured to provide dynamic control of gain assignment on a slot-by-slot basis for time slots used by the system.

19. The system of claim 15, wherein the at least one processor is configured to increase the first power level based on a determination that a low-loaded remote unit is transmitting the first downlink signals using an output power below a threshold power level.

\* \* \* \* \*